United States Patent [19]

Swigert

[11] Patent Number: 4,633,982
[45] Date of Patent: Jan. 6, 1987

[54] SYSTEM FOR WIDE BANDWIDTH DAMPING

[76] Inventor: Charles J. Swigert, 14827 Bestor Blvd., Pacific Palisades, Calif. 90272

[21] Appl. No.: 700,597

[22] Filed: Feb. 11, 1985

[51] Int. Cl.$^4$ ............................................. F16F 15/03
[52] U.S. Cl. .................................... 188/267; 188/379; 318/460
[58] Field of Search ............... 188/379, 380, 266, 267; 318/611, 460

[56] References Cited

U.S. PATENT DOCUMENTS 2,416,337  2/1947  Mason ............................. 188/267 X
2,443,471  4/1948  Mason ............................. 188/267 X

OTHER PUBLICATIONS

Forward, "Electronic Damping of Orthogonal Bending Modes in a Cylindrical Mast-Experiment" *AIAA*-81-4018.
Swigert et al., "Electronic Damping of Orthogonal Bending Modes in a Cylindrical Mast-Theory" *AIAA* 81-4017.
Rockwell et al., "Theoretical and Experimental Results on Active Dampers", The Journal of the Acoustical Society of America, vol. 36, #8, Aug. 84, pp. 1507-1515.
Forward et al., *The Shock and Vibration Bulletin*, No. 53, Part 4, May 1983.

Primary Examiner—Duane A. Reger
Assistant Examiner—Matthew C. Graham

[57] ABSTRACT

A positive electronic feedback circuit for mechanical vibration damping. The feedback circuit is connected from an output transducer fixed to a vibratable structure to an input transducer fixed to the structure. Preferably the feedback circuit has an output signal with a phase about 90 degrees lagging its input signal. Three conditions set forth herein make this possible.

9 Claims, 8 Drawing Figures

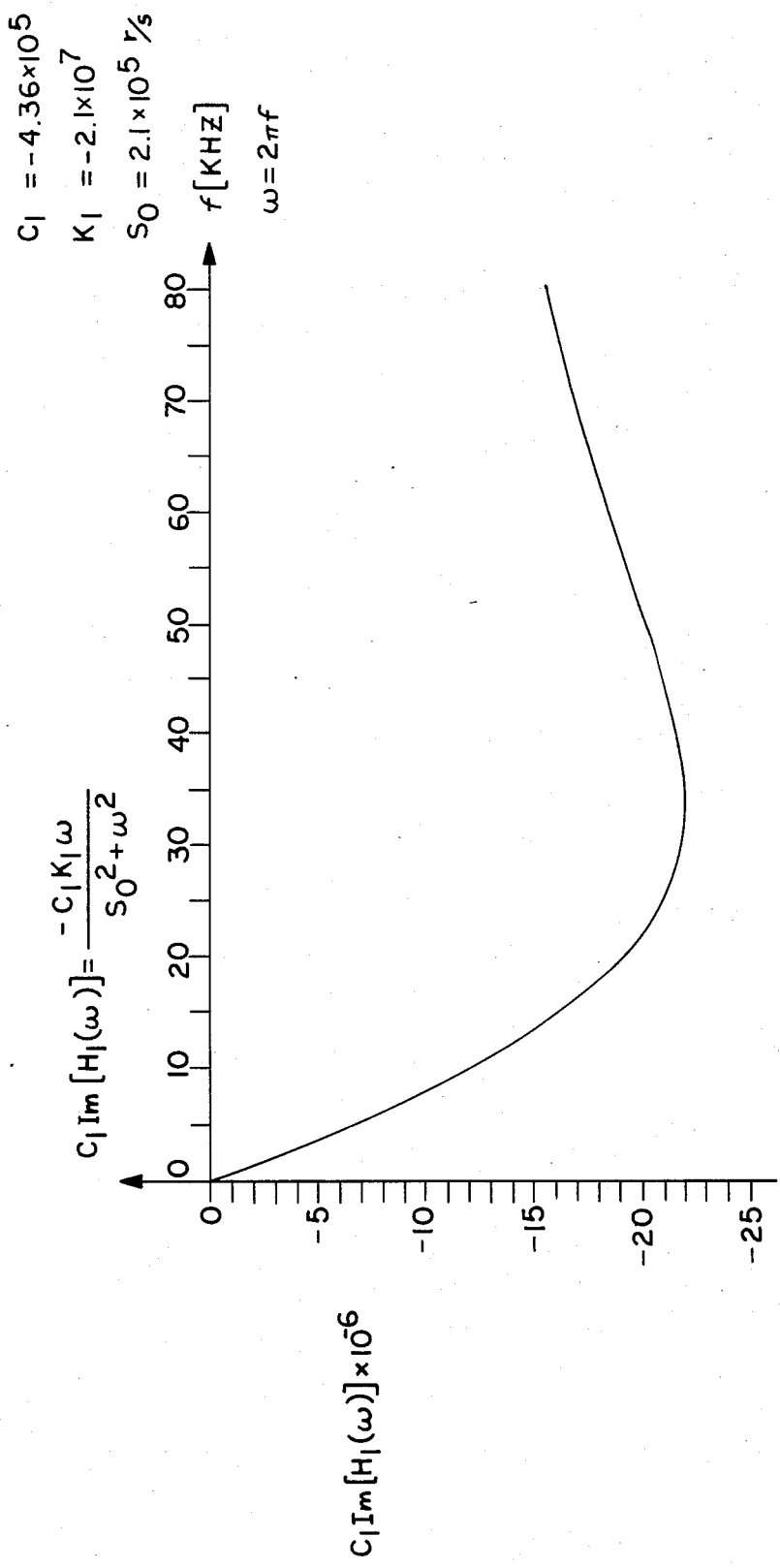
FIG. 5 WIDE BANDWIDTH $H_1(S) = \dfrac{K_1}{S+S_0}$ SATISFIES CONDITION $C_1 \text{Im}[H_1(\omega)] < 0$ FOR ALL $\omega \geq 0$
$C_1 \text{Im}[H_1(\omega)] = \dfrac{-C_1 K_1 \omega}{S_0^2 + \omega^2}$
$C_1 = -4.36 \times 10^5$
$K_1 = -2.1 \times 10^7$
$S_0 = 2.1 \times 10^5$ r/s
$\omega = 2\pi f$

SYSTEM FOR WIDE BANDWIDTH DAMPING

BACKGROUND OF THE INVENTION

This invention relates to vibration analysis, and more particularly to an active damping system for vibratable mechanical structures.

PRIOR ART STATEMENT

Narrow bandwidth damping is known in the prior art. For example, see the following printed publications:

"Theoretical and Experimental Results on Active Vibration Dampers" by T. H. Rockwell and J. M. Lawther (Journal of the Acoustical Society of America, Vol. 36, No. 8, August, 1964).

"Electronic Damping of Orthogonal Bending Modes in a Cylindrical Mast" by R. L. Forward (American Institute of Aeronautics and Astronautics, Inc., AIAA 81-4018, Vol. 18, No. 1, Jan.-Feb., 1981, pp. 5-17).

The Shock and Vibration Bulletin No. 53, Part 4 (The Shock and Vibration Information Center of the Naval Research Laboratory, May, 1983).

SUMMARY OF THE INVENTION

In accordance with the system of the present invention, there is provided an electronic feedback circuit which produces a feedback signal which lags the phase of the feedback circuit input signal by between about 0 and 180 degrees and therefore provides positive feedback in each of the individual resonant modes of vibration of a structure for which vibration damping is sought. Preferably, the feedback signal lags the phase of the circuit input signal by 90 degrees.

Damping is accomplished by satisfying three conditions described in detail hereinafter.

BRIEF DESCRIPTION OF THE DRAWINGS

In the drawings which are to be regarded as merely illustrative:

FIG. 5 is a graph of a variable proportional to the imaginary part of one Laplace transfer function versus a function proportional to frequency;

DESCRIPTION OF THE PREFERRED EMBODIMENT

Figure 1:
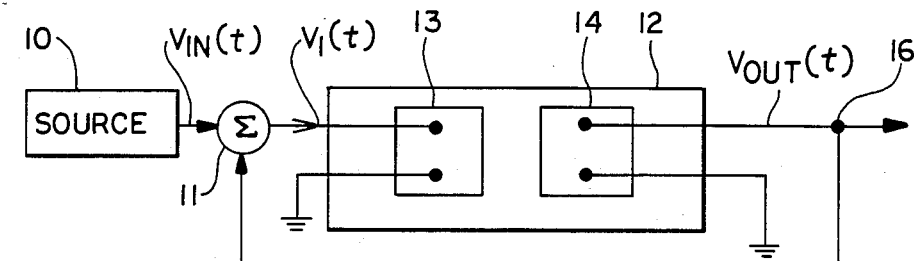
FIG. 1 is a diagrammatic view of the system of the present invention.

In the drawings, in FIG. 1, a source 10 supplies an input voltage $V_{in}(t)$ where t is time.

A summing circuit 11, a mechanical structure 12 to be damped, an input piezoelectric transducer 13, an output piezoelectric transducer 14, and an electronic feedback circuit 15 are also provided.

Structure 12 may be a window or an aluminum bulkhead or a wall. For the examples given herein, it may be assumed that structure 12 is an aluminum block.

Summing circuit 11 impresses an input voltage upon input transducer 13 proportional to the sum of the output voltages of source 10 and feedback circuit 15.

Transducers 13 and 14 may be bonded or otherwise fixed to structure 12 in any conventional way.

Output transducer 14 is connected to an output junction 16, the same being connected to the input of feedback circuit 15. As will be explained, a Laplace transfer function $G(\omega)$ is obtained from a curve fitting process performed after measuring, from time to time, the voltage at $V_{out}(t)$ appearing at junction 16.

The Laplace transfer function $H(\omega)$ of electronic feedback circuit 15 may be defined as:

$$H(\omega) = H_o \frac{\prod_{m=1}^{M} (Z_m + j\omega)}{\prod_{n=1}^{N} (P_n + j\omega)}$$

$$0 \leq M \leq N$$
$$Re(P_n) \geq 0$$

This equation sets forth $H(\omega)$ with transducers 13 and 14 to damp multiple mode structure 12. One of the structural modes has an undamped resonant frequency of $\omega_1$ and $\theta_1$ percent of critical damping. The closed loop circuit has input voltage $V_{in}(t)$ and voltage $V_{out}(t)$. The poles $P_n$ and zeroes $Z_m$ of feedback circuit 15 can be real or complex, $Re(P_n) \geq 0$.

Figure 2:
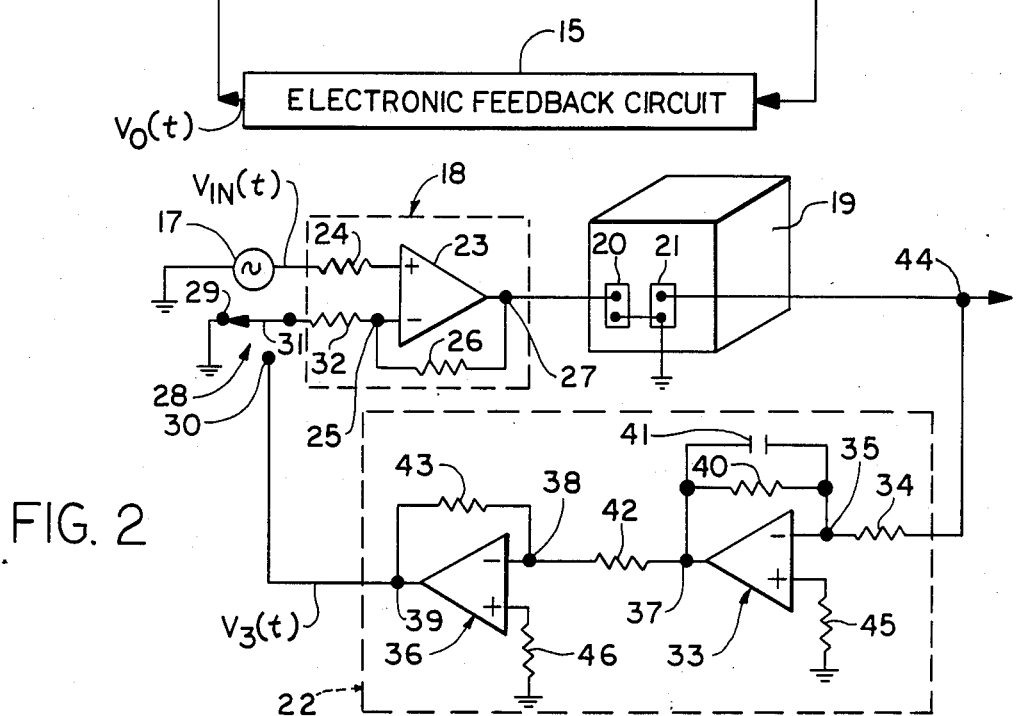
FIG. 2 is a schematic diagram of one specific embodiment of the present invention.

One embodiment of the invention is shown in FIG. 2 with a source 17, a summing circuit 18, an aluminum block 19, input and output transducers 20 and 21, respectively, and an electronic feedback circuit 22.

Summing circuit 18 includes a differential amplifier 23 having a noninverting input connected via a resistor 24 from source 17, an inverting input connected from a junction 25, and a feedback resistor 26 connected from junction 25 to an output junction 27.

A switch 28 is provided having a grounded contact 29, a contact 30 connected from the output of feedback circuit 22, and a pole 31. A resistor 32 is connected from junction 25 to pole 31.

Junction 27 is connected to input transducer 20. Output transducer 21 is connected to an inverting input of a differential amplifier 33 via a resistor 34 and a junction 35 in feedback circuit 22.

Another differential amplifier is shown at 36. Each of the amplifiers 33 and 36 have their noninverting inputs grounded via resistors 45 and 46, respectively.

Amplifier 33 has an output junction 37. Amplifier 36 has input and output junctions 38 and 39, respectively.

Amplifier 33 has feedback including a resistor 40 connected in parallel with a capacitor 41 and between junctions 35 and 37.

A resistor 42 is connected between junctions 37 and 38. A feedback resistor 43 is connected between junctions 38 and 39. Junction 39 is connected to switch contact 30.

A portion of the apparatus of FIG. 2 is employed in the verification of circuit values used in electronic feedback circuit 22.

Switch pole 31 is maintained in the position shown and $V_{out}(t)$ is measured on output junction 44 to obtain data to plot a Laplace transfer function $G(\omega)$.

Switch pole 31 is then moved into engagement with contact 30 for vibration damping operation.

Circuit values for FIG. 2 arrived at according to the present invention follow:

Capacitor 41: 100 pfds.
Resistor 24: 15,000 Ohms
Resistor 26: 470,000 Ohms
Resistor 32: 15,000 Ohms
Resistor 34: 150,000 Ohms
Resistor 40: 47,000 Ohms
Resistor 42: 15,000 Ohms
Resistor 43: 150,000 Ohms
Resistor 45: 47,000 Ohms
Resistor 46: 15,000 Ohms

DAMPING CONDITIONS

In accordance with the present invention, devices may be constructed which demonstrate wide bandwidth active damping (WBAD) of a lightly damped, multiple mode mechanical structure.

The technique relies on the method of coupling a mechanical structure with multiple resonant modes to a damped electrical filter and amplifier so as to extract power from the mechanical structure and dissipate the power in the electrical circuit.

This technique is unique and further different from prior techniques.

The mode sensing transducers are used to sense the displacements of the resonant modes of the structure, rather than rigid body displacements of the structure and rather than velocity or acceleration components of the structure. Mode sensing transducers include electromechanical transducers, such as piezoelectric transducers, as well as acoustic transducers, such as microphones. Mode driving transducers include piezoelectric transducers, as well as electric motors.

A positive feedback circuit with Laplace transfer function $H(\omega)$ including transducers 20 and 21, that generates the output signal that damps the resonant modes of the structure, operates primarily with phase lag between zero degrees to +180 degrees over the frequency range of the modes to be damped (where 90 degrees phase lag is preferred).

Conditions imposed on the electronic feedback circuit $H(\omega)$, obtained from the Laplace transform by substitution of $j\omega$ for Laplace variable s are shown below to be:

$$G(\omega) \cdot H(\omega) < 1 \text{ for all } \omega > 0 \text{ when } Im[G(\omega) \cdot H(\omega)] = 0 \quad (1)$$

where the modes of $G(\omega)$ are described below, and $$c_o Re[H(\omega)] < 1. \text{ for all } \omega 0 \text{ when } Im[H(\omega)] = 0 \quad (2)$$

where Im(x) and Re(y) denote the real components of complex variables x and y, respectively, $c_o$ is a constant, $$c_n Im[H(\omega)] < 0. \text{ for all } \omega > 0, n = 1 \ldots \quad (3)$$

and n refers to the mode of resonant frequency n which is to be actively damped. The description in the body hereof is restricted to the case for n=1.

Note that if the Laplace transform of circuit 22 (FIG. 2) is $G_s(s)$, then $G(\omega) = G_s(j\omega)$ Similarly, $$H(\omega) = H_s(j\omega)$$

The constant $c_o$ is defined in the Laplace transfer function $G(\omega)$ thus:

$$G(\omega) = c_o + \sum_{n=1}^{K} \frac{c_n}{\omega^2_n - \omega^2 + j2\theta_n\omega_n\omega} \quad (4)$$

where the Greek letter sigma conventionally means "the sum of," the "sum" is the sum of the fractions produced by substituting n=1, n=2, n=3, and so forth until n=K. K is the number of modal resonant frequencies being controlled, and $\theta$ is the Greek letter zeta with the subscript n.

It is conventional and well known to use the Greek sigma and the symbols of equation (4) above and below the Greek sigma. It is also conventional to use this with a function to the right thereof having constants with subscripts n to identify different corresponding values of the constants for different values of n.

It is old and well known that each of the values of n are positive integers.

The value of K is the highest value of n. This is old and well known. The value of K is also a positive integer because n is always a positive integer and K is the maximum value of n. This is also old and well known.

The value of K is defined as the number of modes controlled. A mode is defined in many prior art references, including but not limited to the "American Institute of Physics" (Third Edition, 1972). This reference reads "A normal mode of vibration is a mode of an umdamped system. In general, any composite motion of the system is analyzable into a summation of its normal modes." An analysis of this summation of modes is described in the paper "Electrical Damping of Orthogonal Bending Modes in a Cylindrical Mast" by Charles J. Swigert and Robert L. Forward, *Journal of Spacecraft and Rockets*, Vol. 18, No. 1, Jan–Feb., 1981, pp. 5–10, a companion paper to that cited in the prior art statement set forth herein.

Parameter K is the number of modes, n=1, n=2, ..., n=K, having resonant frequencies $\omega_1, \omega_2, \ldots, \omega_K$, respectively, that can describe the composite motion of the structure over the range of resonant frequencies $\omega_n$ that lie within the passband of the electronic feedback circuit.

Actually, K may be very large. The feedback circuit H(s) can provide improved stability of the structure G(s) over the passband of the feedback circuit. Stability is provided by satisfying the three conditions set forth herein for each mode with resonant frequency $\omega_n$.

The Greek zeta in equation (4) is old and well known in the prior art. It is called "relative damping." The identical Greek letter zeta is used in the prior art as a symbol for relative damping.

In Van Nostrand's Scientific Encyclopedia (Sixth Edition), "relative damping" is defined thus: "For an underdamped system, a number expressing the quotient of the actual damping of a second-order linear system or element and its critical damping .... When the time response to an abrupt stimulus is as fast as possible without overshoot, the response is said to be critically damped underdamped when overshoot occurs overdamed when response is slower than critical."

The technique can operate to damp the modes over either a wide bandwidth or a narrow bandwidth. Operating over a wide bandwidth, the WBAD can damp many modes in a structure (though not necessarily all of them) over a wide band of mechanical resonances, e.g., over more than an octave of modal resonant frequencies of the structure. Narrowing the bandwidth of the damper to a selected band of resonant modes, the mechanical power being extracted from the modes can be absorbed by an electrical filter with a lower power rating than would be required if all the modes were to be similarly damped simultaneously.

Damping the $n^{th}$ mode, for $n = 1, 2, \ldots$ generally requires the condition on $c_o$ and $c_n$ that $$sgn(c_o) = -sgn(c_n)$$

This condition can be obtained by placing two strain transducers adjacent to each other with polarities matched on a conducting surface. Both electrodes at one end are grounded together. The electrodes on the other end of the two transducers are used to inject the input voltage $V_{in}(t)$ and to receive the output voltage $V_{out}(t)$.

The wide bandwidth active damper (WBAD) of the present invention can be used to damp the vibrations on:

(a) large, flat rigid surfaces, such as windows;
(b) column or beam-like structures, such as water pipes or I-beams;
(c) chassis and shaker components of structures being shaken or vibrated, like printers, disk drives, vehicles, telescopes and radar antennae.

An aluminum block 19 (FIG. 2) ($4'' \times 1.5'' \times 1''$) with piezoceramic strain gauges 20 and 21 (Piezo Electric Products P/N SG-4M) are epoxy bonded to the block as shown in FIG. 2. The block 19 is suspended on rubber bands to minimize modal damping. Each of the strain gauge transducers 20 and 21 produce an output voltage when strained by the block, and each transducer will apply a stress to the block when a voltage is applied to the transducer. The piezoelectric transducers 20 and 21 are used for active damping of the block's modes of vibration.

Modal resonant frequencies of the block 19 may include:

$f_1 = 24,770$ Hz
$f_2 = 54,300$ Hz
$f_3 = 71,800$ Hz
$f_4 = 108.7$ kHz
$f_5 = 123.0$ kHz
$f_6 = 151.5$ kHz
$f_7 = 185.0$ kHz
$f_8 = 218.0$ kHz

Note: $\omega_n = 2\pi f_n$

The electronic circuit 22 consists of two National LF356N operational amplifiers 33 and 36, assorted resistors and capacitors and a Heathkit Sine-Square Audio Generator (Model IG-18) to generate $V_{in}(t)$. The electronic circuit is shown in an open loop configuration, since the switch 28 is in the OFF position. This circuit, with the switch 28 in the OFF position, allows measurement of $G(s)$ for selected modes. Table I lists $$G(f) = \frac{V_{out}}{V_{in}}(f)$$

for the resonant mode $f = 24,770$ Hz. Voltage amplitude and phase was measured on a Tektronix Model 531A oscilloscope.

TABLE I

TRANSFER FUNCTION OF STRUCTURE AND TRANSDUCERS FOR RESONANT MODE AT 24,770 Hz.

$$\frac{V_{out}}{V_{in}}(t)$$

| f | Real (in phase magnitude) | Imaginary (out of phase magnitude) |
|---|---|---|
| 24,300 | .0071 | .0000 |
| 24,500 | .0071 | .0000 |
| 24,620 | .0064 | .0000 |
| 24,650 | .0057 | .0000 |
| 24,735 | .0013 | .0013 |
| 24,755 | −.0063 | .0063 |
| 24,758 | −.0076 | .0076 |
| 24,770 | .0083 | .031 |
| 24,774 | .023 | .023 |
| 24,780 | .019 | .009 |
| 24,785 | .018 | .007 |
| 24,800 | .0129 | .0035 |
| 24,850 | .0098 | .0008 |
| 25,000 | .0089 | .0000 |

Measurement of the data in Table I is made for parameter estimation of $c_o$, $c_1$, $\omega_1$ and $\theta_1$ in $G_1(s)$ transfer function $$G_1(s) = c_o + \frac{c_1}{s^2 + 2\sigma_1\omega_1 s + \omega_1^2} \quad (5)$$

Replacement of $s$ with $j\omega$ in eqn (5) gives eqn (6)

$$G_1(\omega) = c_o + \frac{c_1}{\omega_1^2 - \omega^2 + j2\sigma_1\omega_1\omega} \quad (6)$$

Figure 3:
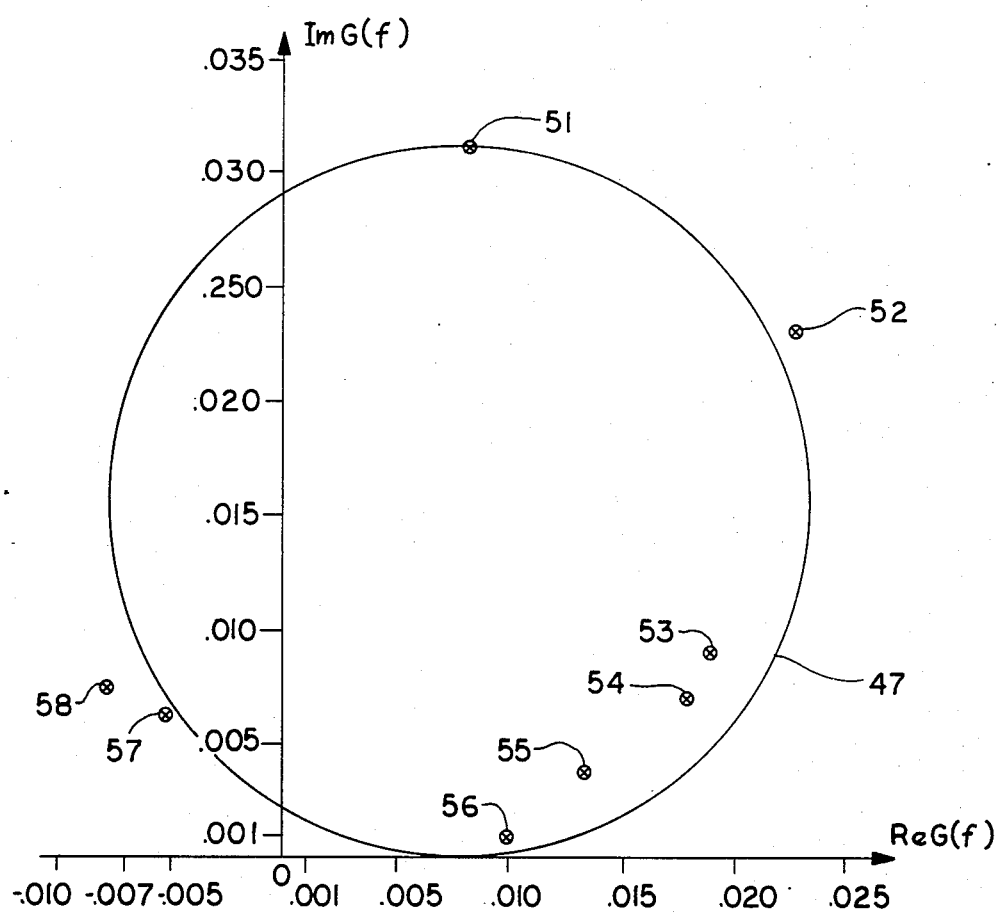
FIG. 3 is a graph illustrating a curve fitting and step required to verify circuit values for the invention.

A good fit of the measured $G(\omega)$ data in Table I with the model of $G_1(\omega)$ in eqn (6) is shown in FIG. 3. Parameter estimates are:

$c_o = 0.0079$ \hfill (7)

$\omega_1 = 115.6 \times 10^3 r/s (f_1 = 24,770$ Hz) \hfill (8)

$c_1/\omega_1^2 = -18 \times 10^{-6}$ $(c_1 = -436 \times 10^3)$ \hfill (9)

$2\theta_1 = 0.00058$ \hfill (10)

Note from the analysis discussions $$sgn(c_o) = -sgn(c_1) \quad (11)$$

and that $$sgn\left(c_o + \frac{c_1}{\omega_1^2}\right) = sgn(c_o)$$

These structural/transducer characteristics allow circuit gain $H_o$ to be large and not violate the stability limits. Parameter $c_o$ can be changed by changing the relative location and orientation of the transducers. Parameter $c_1$ can be changed by shifting the transducers 20 and 21 on the structure to vary the coupling to each other.

Thus, circle 47 in FIG. 3 is a good curve fit to points 51–58 of the data.

THE FIG. 2 EMBODIMENT

A wide bandwidth electronic damping circuit transfer function $H(\omega)$ will be constructed according to the following to damp the resonant modes at frequencies $f_1 = 24{,}770$ Hz and $f_2 = 54{,}300$ Hz. Damping $f_1$ is based on the measured parameters of $G(f)$ at frequency $f_1$.

An evaluation of the stability of $H(\omega)$ is made experimentally to test whether other modes may be unstable, i.e., and oscillate. The unstable mode will oscillate at its resonant frequency, which can then be measured. This resonant mode can then be experimentally characterized and circuit $H_1(\omega)$ modified to regain stability of this unstable mode. To gain stability of this resonant mode, it is necessary to modify $H(\omega)$ by changing its gain or pole and zero locations to satisfy conditions (1), (2) and (3) for stability of this new mode. As each unstable mode is stabilized, the next (less) unstable mode in sequence will oscillate and require stabilization. When all of the modes are stable, none of these modes will oscillate.

The circuit transfer function to be evaluated for wide bandwidth damping is $$H_1(\omega) = \frac{H_o}{s_o + j\omega}, \quad s_o > 0 \tag{12}$$

Since the parameters estimated in equations (7) to (10) yield the conditions $$\text{sgn}(c_o) = -\text{sgn}(c_1) \tag{13}$$

and $$\text{sgn}\left(c_o + \frac{c_1}{\omega_1^2}\right) = \text{sgn}(c_o)$$

then circuit gain $H_o$ can be large without violating the stability limits.

Resonant mode $f_1$ is best damped with $s_o \approx \omega_1$. However, good damping of the second resonant mode at $f_2 = 54{,}300$ Hz is desired as well. Thus $s_o$ is placed at 33 KHz, intermediate between $f_1$ and $f_2$. The value of $s_o$ is $$s_o = 2\pi\,(33\text{ kHz}) = 220 \times 10^3\ r/s \tag{14}$$

This choice of $s_o$ provides 45° of phase lag at 33 kHz with minimum reduction in gain at 33 kHz. Consequently, at $f_1 = 24{,}770$ Hz, $H_1(f_1)$ provides 35° of phase lag at a loop gain of 1.4, as shown in Table II. Table II illustrates that active damping of resonant mode $f_1$ reduces the modal response by $\times 0.44$. At $f_2 = 53{,}300$ Hz, $H_1(f_2)$ provides 57° of phase lag at a loop gain of 11.0 (Table II). Active damping of resonant mode $f_2$ reduces, i.e., scales, the modal response to a factor of $\times 0.082$, or 8.2 percent of the mode's undamped response.

FIG. 2 illustrates an electronic feedback circuit to damp the aluminum block structure with $$H_1(s) = \frac{H_o}{s + s_o} \tag{15}$$

$s_o = 2.1 \times 10^5\ r/s$ $H_o = -2.1 \times 10^7$

With the switch 28 set to OFF, the feedback circuit is interrupted, and allows the undamped resonant response to the input excitation $V_{in}(t)$ to be measured at $V_3(t)$. Turning the switch to ON, the feedback circuit is completed and allows damping of the resonant response to $V_{in}(t)$. For the same input excitation $V_{in}(t)$, closed loop positive feedback provides a significant reduction in the modal response, as measured at $V_3(t)$.

TABLE II

OPEN AND CLOSED LOOP RESPONSE OF STRUCTURE WITH WIDE BANDWIDTH ELECTRONICS (K = 3 MODES)

| f[Hz] | Open Loop Response $\frac{V_3}{V_{in}}$ for Switch OFF | Closed Loop Response $\frac{V_3}{V_{in}}$ for Switch ON | Modal Response Reduction $\frac{V_3(S_{ON})}{V_{in}(S_{OFF})}$ |
|---|---|---|---|
| 24,000 | 0.88 | 0.50 | 0.57 |
| $f_1 = 24{,}770$ | 1.42 | 0.62 | 0.44 |
| 25,000 | 0.89 | 0.54 | 0.61 |
| $f_2 = 54{,}300$ | 11.0 | 0.90 | 0.082 |
| $f_3 = 71{,}800$ | 0.80 | 0.65 | 0.81 |

Table II lists the amplitudes for the undamped response of the open loop circuit $G(\omega).H(\omega)$ with switch 28 OFF, and for the damped response of the closed loop circuit $G(\omega).H(\omega)$ with switch 28 ON. The fractional reduction in modal response is given in the last column. It is interesting to note that the mode with the largest open loop response, at the 54.3 kHz resonant frequency, is the most strongly damped. All of the other modes are significantly damped, e.g., by 20 percent or more. Further damping can be obtained by raising the gain, increasing the $H(\omega)$ phase lag, or adding additional active damping circuits.

A moderate bandwidth electronic damping (feedback) circuit transfer function $H_2(\omega)$ will now be constructed. The circuit $H_2(\omega)$ will be employed to damp the resonant modes at the frequencies $f_1 = 24{,}770$ Hz and $f_2 = 54{,}300$ Hz. The experimental design for damping $f_1$ is based on the measured parameters of $G(f)$ at $f_1$. The test for stability of $H_2(\omega)$ is made experimentally to determine what other modes are unstable and oscillate.

Figure 4:
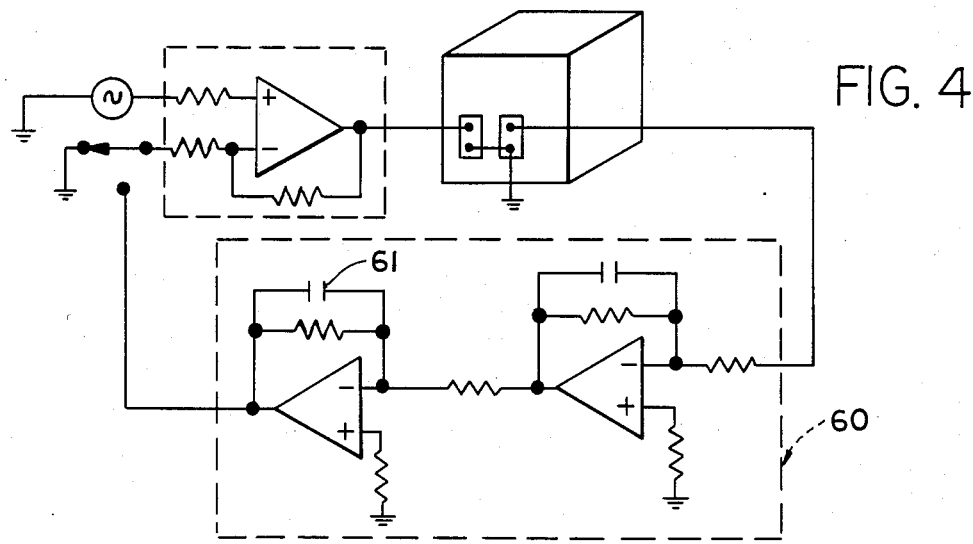
FIG. 4 is a schematic diagram of a second specific embodiment of the present invention.

If desired, the system in FIG. 4 may be the same as that shown in FIG. 2 except for an electronic feedback circuit 60. Even circuits 22 and 60 are identical except for the addition of a 22 picofarad capacitor 61.

THE FIG. 4 EMBODIMENT

The circuit transfer function to be evaluated for moderate bandwidth damping is $$H_2(\omega) = \frac{H_o}{(s + P_1)(s + P_2)} = \frac{H_o}{s^2 + 2\sigma_o\omega_o s + \omega_o^2}, \quad \sigma_o \geq 1 \tag{16}$$

To allow $H_o$ to be large in magnitude, we need $$\text{sgn}(c_o) = -\text{sgn}(c_1) \tag{17}$$

and $$\text{sgn}(c_1) = \text{sgn}(H_o) \tag{18}$$

This provides $$\text{sgn}(c_1 H_o) > 0 \tag{19}$$

and $$\text{sgn}(c_o H_o) < 0 \tag{20}$$

For arbitrarily large $H_o$, $$\text{sgn}\left(c_o + \frac{c_1}{\omega_1{}^2}\right)\text{sgn}(c_o) \qquad (21)$$

These conditions are satisfied by the parameters for the structural resonance at $f_1$ with the circuit transfer function $H_2(\omega)$ provided by the circuit in FIG. 4. The circuit has transfer function $$H_2(s) = \frac{H_o}{(s + s_o)(s + s_1)}, \qquad (22)$$

$$s_o = 2.1 \times 10^5 \text{ r/s}$$

$$= 2\pi(33.4 \text{ kHz})$$

$$s_1 = 3.0 \times 10^5 \text{ r/s}$$

$$= 2\pi(48.2 \text{ kHz})$$

$$H_o = -1.35 \times 10^{13}$$

The resonant mode $f_1$ is best damped with $w_o \approx 1.7\omega_1$ when $\theta_o = 1$. i.e., $s_o = s_1 = \omega_o$ with $H_2(s)$ critically damped. Good damping of the second resonant mode is desired at $f_2 = 54,300$ Hz. With $\omega_1 = 2\pi(24,770$ Hz$) = 1.56 \times 10^5$ then $\omega_o \approx 1.7\omega_1 = 2.7 \times 10^5$ is wanted, for dampoing of $f_1$. By placing $s_o$ and $s_1$ above and below this $\omega_o$ estimate, we broaden the damping bandwidth. Thus, we place $s_o = 2\pi(33$ kHz$)$ near the first resonance at $f_1 = 24.77$ kHz and we place $s_1 = 2\pi(48.2$ kHz$)$ near the second resonance at 54.3 kHz to obtain good damping of both modes.

Table III shows this choice of $s_o$ and $s_1$ provides a loop gain of 2.4 at resonance $f_1 = 24.77$ kHz with 64° of phase lag. Closed loop damping scales mode $f_1$ response by $\times 0.35$. Table III shows resonance $f_2 = 54.3$ kHz has an open loop gain of 8.0 with 106° of phase lag. Closed loop damping scales the modal response by 0.088 to 8.8 percent of its undamped magnitude.

The limited damping bandwidth of $H_2(\omega)$ is illustrated in Table III by the reduction in natural damping at the resonance $f_3 = 71.8$ kHz where an increase in the modal response is seen by $\times 1.97$. This occurs because a condition is being violated. However, the closed loop system remains stable. In those applications where there is minimal excitation of the system at these high resonant frequencies, e.g., at $f_3 = 71.8$ kHz, it is useful to limit the bandwidth over which the damper circuit needs to operate. The two pole circuit $H_2(\omega)$ provides this capability to limit the damping action to the desired bandwidth of frequencies.

TABLE III

OPEN AND CLOSED LOOP RESPONSE OF STRUCTURE WITH MODERATE BANDWIDTH ELECTRONICS (N = 2 in FIG. 1)

| f[Hz] | Open Loop Response $\frac{V_3}{V_{in}}$ for $S_{off}$ | Closed Loop Response $\frac{V_3}{V_{in}}$ for $S_{on}$ | Model Response Reduction $\frac{\left(\frac{V_3}{V_{in}}(S_{on})\right)}{\left(\frac{V_3}{V_{in}}(S_{off})\right)}$ |
|---|---|---|---|
| 24,000 | 1.35 | 0.82 | 0.61 |
| 24,770 | 2.40 | 0.85 | 0.35 |
| 54,300 | 8.00 | 0.70 | 0.088 |
| 71,800 | 0.62 | 1.22 | 1.97 |

PROOF

The plots of FIGS. 5–8 illustrate that the three conditions for damping described above are met in FIGS. 2 and 4. Equation (1) is:

$$G(\omega).H(\omega) < 1 \text{ for all } \omega > 0 \text{ that } Im[G(\omega).H(\omega)] = 0 \qquad (1)$$

This is condition (1), or $C_1$.
Equation (2) is:

$$c_o Re[H(\omega)] < 1 \text{ for all } \omega > 0 \text{ that } Im[H(\omega)] = 0 \qquad (2)$$

This is condition (2), or $C_2$.
Equation (3) is:

$$c_n Im[H(\omega)] < 0 \text{ for all } \omega > 0, \text{ for each of the modes,} \\ n = 1, 2, \ldots \qquad (3)$$

This is condition (3), $C_3$. This condition is specialized to a discussion for the first mode, $n = 1$, though it must be satisfied by all the modes.

Figure 7:
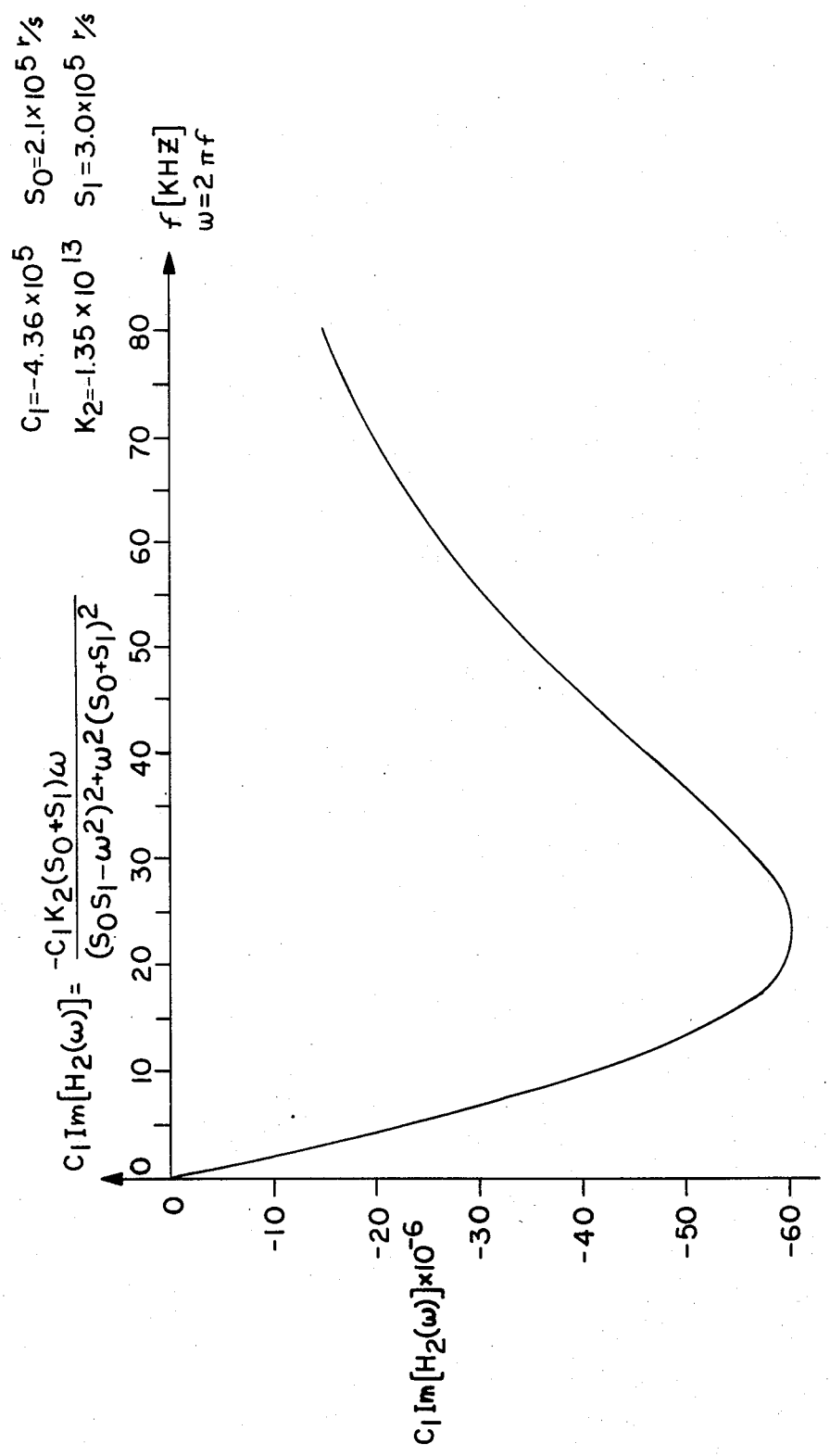
FIG. 7 is a graph of a variable proportional to the imaginary part of still another Laplace transfer function versus a function proportional to frequency.

For condition (3)($C_3$), $c_1 Im[H(\omega)]$ is plotted in FIGS. 5 and 7 for the two circuits $H_1(s)$ and $H_2(s)$ described previously. These plots show that conditions $C_3$ that $c_1 Im[H(\omega)] < 0$ is satisfied $H_1(\omega)$ and $H_2(\omega)$ for all $\omega > 0$.

For condition (2),($C_2$), $c_1 Im[H(\omega)]$ as plotted is used to determine that $\omega$ when $Im[H(\omega)]$ is zero. This $\omega$ is used to evaluate $c_o Re[H(\omega)]$ and show that $c_o Re[H(\omega)] < 1$ for those $\omega$ for which $Im[H(\omega)] = 0$. (No plot for $C_2$).

Figure 6:
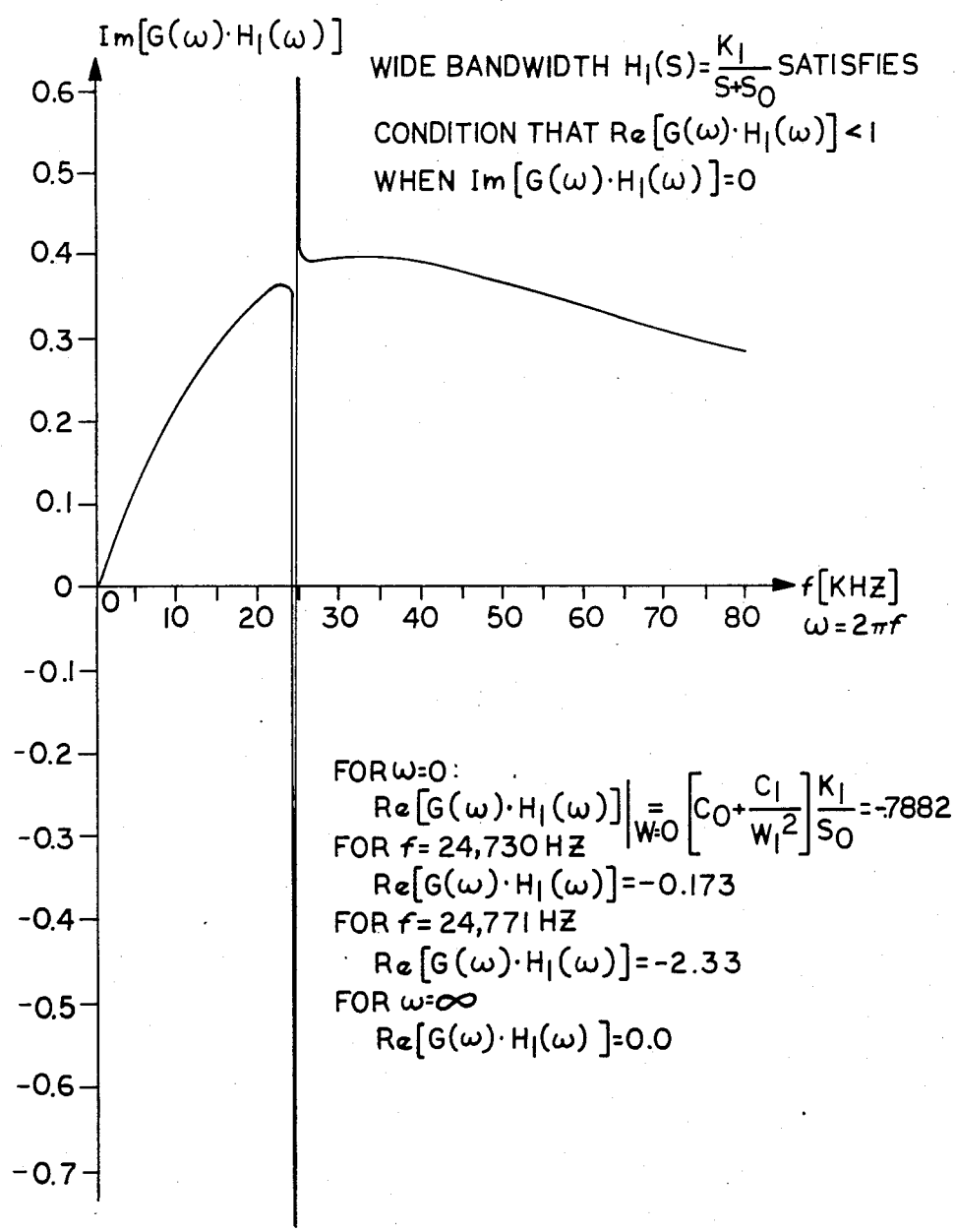
FIG. 6 is a graph of an imaginary part of the product of two Laplace transfer functions versus a function proportional to frequency.
Figure 8:
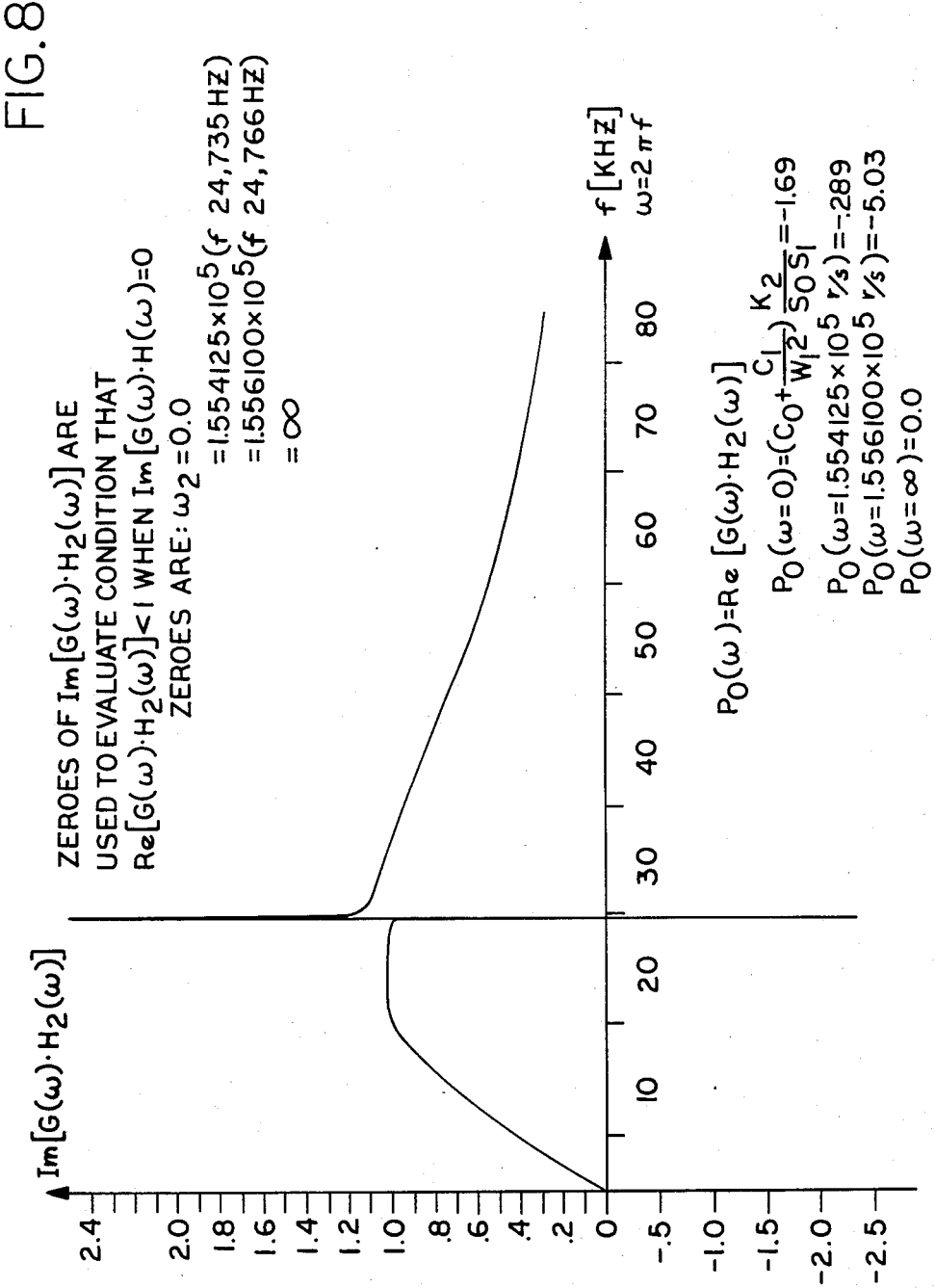
FIG. 8 is a graph of an imaginary part of the product of still two other Laplace transfer functions versus a function proportional to frequency.

For condition (1), ($C_1$), $Im[G(\omega).H(\omega)]$ is plotted in FIGS. 6 and 8 to locate where (which $\omega$) that $Im[G(\omega).H(\omega)] = 0$.

For those $\omega$ that satisfy the zero condition, an evaluation is made and it is shown that $G(\omega).H(\omega) < 1$ for both $H_1(\omega)$ and $H_2(\omega)$.

Functions used are:

$$G(s) = c_o + \frac{c_1}{s^2 + 2\sigma_1\omega_1 s + \omega_1{}^2},$$

$$c_o = .0079$$

$$c_1 = -436 \times 10^3$$

$$\omega_1 = 155.6 \times 10^3 \text{ r/s}$$

$$2\sigma_1 = .00058$$

$$H_1(s) = \frac{K_1}{s_o + s}$$

$$s_o = 2.1 \times 10^5 \text{ r/s}$$

$$K_1 = -2.1 \times 10^7 \text{ r/s}$$

-continued $$H_2(s) = \frac{K_2}{(s + s_o)(s + s_1)}$$

$$K_2 = -1.35 \times 10^{13}$$

$$s_o = 2.1 \times 10^5 \text{ r/s}$$

$$s_1 = 3.0 \times 10^5 \text{ r/s}$$

$H_1(s)$ CONDITIONS

FIG. 5 illustrates condition $C_3$ is satisfied for $H_1(\omega)$ for mode 1.

That is, $$P_3(\omega) = c_1 \, Im[H_1(\omega)] = \frac{-c_1 K_1 \omega}{s_o^2 + \omega^2} < 0 \text{ for all } \omega > 0$$

For condition $C_2$, identify those $\omega$ for which $Im[H_1(\omega)]=0$. This occurs at $\omega=0$ and $\omega=\infty$. Evaluating $c_o Re[H_1(\omega)]$, $$P_2(\omega = 0) =$$

$$c_o Re[H_1(\omega = 0)] = \frac{c_o K_1 s_o}{s_o^2 + \omega^2}\bigg]_{\omega=0} = \frac{c_o K_1}{s_o} = -79.0$$

This is less than 1.0.

$$P_2(\omega = \infty) = c_o Re[H_1(\omega = \infty)] = \frac{c_o K_1 s_o}{s_o + \omega^2}\bigg]_{\omega=\infty} = 0.$$

This is less than 1.0.

Thus, condition $C_2$ is satisfied for $H_1(s)$.

FIG. 6 illustrates the plot $Im[G(\omega).H_1(\omega)]$. While requiring a bit of work, it shows in FIG. 6 that $$P_1(\omega) = Im[G(\omega).H_1(\omega)] = 0$$

at $\omega_z = 0$, $\infty$, $1.553822 \times 10^5$ r/s, $1.556403 \times 10^5$ r/s ($f = 24,730$ Hz) ($f = 24,771$ Hz)

Evaluation of $P_o(\omega_z) = Re[G(\omega_z).H_1(\omega_z)]$ for each of these $\omega_z = G(\omega_z).H_1(\omega_z)$ gives $$P_o(\omega_z=0) = -0.788$$

$$P_o(\omega_z=1.553822 \times 10^5) = -0.173$$

$$P_o(\omega_z=1.556403 \times 10^5) = -2.33$$

$$P_o(\omega_z=\infty) = 0.0$$

Thus, all $P_o(\omega_z) < 1$, satisfying $C_1$.

Thus, condition $C_1$ is satisfied for $H_1(s)$, thus satisfying all of the design conditions (at least for the first mode, by $C_3$). Damping and stability of the other modes require verification of $C_3$ and $C_1$ for $n=2, \ldots$ and can be done experimentally.

$H_2(s)$ CONDITIONS

FIG. 7 illustrates condition $C_3$ is satisfied for $H_2(\omega)$ for mode 1. That is, $$P_3(\omega) = c_1 \, Im[H_2(\omega)] = \frac{-c_1 K_2 (s_o + s_1) \omega}{(s_o s_1 - \omega^2)^2 + (s_o + s_1)^2 \omega^2} < 0$$

for all $\omega > 0$.

For condition $C_2$, identify those $\omega$ for which $Im[H_2(\omega)]=0$. This occurs at $\omega=0$ and $\omega=\infty$. Evaluating $c_o Re[H_1(\omega)]$, $$P_2(\omega=0) = c_o Re[H_2(\omega=0)] = -1.69$$

This is less than 1.0

$$P_2(\omega = \infty) = \frac{c_o K_2(s_o s_1 - \omega^2)}{(s_o s_1 - \omega^2)^2 + \omega^2(s_o + s_1)^2}\bigg]_{\omega=\infty} = 0$$

This is less than 1.0.

Thus, condition $C_2$ is satisfied for $H_2(s)$, as is $C_1$ above.

FIG. 8 illustrates the plot of $P_1(\omega) = Im[G(\omega).H_2(\omega)]$. While requiring even more work, it shows in FIG. 8 that $$P_1(\omega) = Im[G(\omega).H_2(\omega)] = 0$$

at $\omega_z = 0$, $\infty$, $1.554125 \times 10^5$, $1.556100 \times 10^5$ ($f = 24,735$ Hz) ($f = 24,766$ Hz)

Evaluation of $P_o(\omega_z) = G(\omega_z).H_2(\omega_z)$ for each of these $\omega_z = Re[G(\omega_z).H_2(\omega_z)]$ gives $$P_o(\omega_z=0) = -1.69$$

$$P_o(\omega_z=1.554125 \times 10^5 r/s) = -0.289$$

$$P_o(\omega_z=1.556100 \times 10^5 r/s) = -5.03$$

$$P_o(\omega_z=\infty) = 0.0$$

Thus, all these $P_o(\omega_z) < 1$ so that condition $C_1$ is satisfied for $H_2(s)$. Thus, all the design conditions are satisfied for damping and stability of the first mode.

What is claimed is:

1. A system for wide bandwidth damping, said system comprising:
   a vibratable mechanical structure to be damped;
   an input transducer responsive to an input signal to affect vibration of said mechanical structure;
   an output transducer responsive to displacement vibration of said mechanical structure for producing an output signal in accordance therewith;
   an active electronic feedback circuit connected from said output transducer for producing a positive feedback signal to each resonant mode to be damped;
   a signal souce; and
   an input circuit for impressing an input signal on said input transducer directly proportional to the sum of the output signals of said source and said feedback circuit,
   said feedback circuit supplying said feedback signal to said input circuit with a phase lagging the output signal of said output transducer by more than 0° and less than 180°, wherein:
   said feedback signal has a phase which lags said output transducer output signal by approximately 90°, and wherein:

said input and output transducers are vibration sensitive transducers fixed to said structure in spaced relative positions;

said electronic feedback circuit is connected from said output transducer to said input transducer, said circuit having a Laplace transfer function $H(\omega)$ where $\omega$ is radian frequency, said circuit having circuit components with values such that $H(\omega)$ meets conditions (1), (2) and (3) as follows:

$$G(\omega)H(\omega) < 1 \text{ for all } \omega \text{ when } Im[G(\omega)H(\omega)] = 0 \quad (1)$$

$G(\omega)$ being the Laplace transfer function through said input transducer, through said structure and through said output transducer, $Im[G(\omega)H(\omega)]$ being the imaginary part of the complex product $G(\omega)H(\omega)$, (2) $c_o Re[H(\omega)] < 1$, for all $\omega > 0$ that $Im[H(\omega)] = 0$, $c_o$ being a constant, $Re[H(\omega)]$ being the real part of the complex variable $H(\omega)$, and $Im[H(\omega)]$ being the imaginary part of $H(\omega)$, and (3) $c_n Im[H(\omega)] > 0$ for all $\omega > 0$ and one or more of the modes to be damped, where for each said mode $n = 1, 2, \ldots$, each $c_n$ being a constant, $Im[H(\omega)]$ being the imaginary part of the complex variable $H(\omega)$.

2. A system for wide bandwidth damping as claimed in claim 1, $c_o$ being defined in $G(\omega)$ as follows:

$$G(\omega) = c_o + \sum_{n=1}^{K} \frac{c_n}{\omega_n^2 - \omega^2 + j2\theta_n\omega_n\omega} \text{ and } c_1 = c_n \Big]_{n=1}$$

where K is the number of resonant modes controlled, and $\theta$ is relative damping.

3. A system for wide bandwidth damping, said system comprising:

a vibratable mechanical structure to be damped;

an input transducer responsive to an input signal to affect vibration of said mechanical structure;

an output transducer responsive to displacement vibration of said mechanical structure for producing an output signal in accordance therewith;

an active electronic feedback circuit connected from said output transducer for producing a positive feedback signal to each resonant mode to be damped;

a signal source; and an input circuit for impressing an input signal on said input transducer directly proportional to the sum of the output signals of said source and said feedback circuit, said feedback circuit supplying said feedback signal to said input circuit with a phase lagging the output signal of said output transducer by more than 0° and less than 180°, wherein:

said input and output transducers are vibration sensitive transducers fixed to said structure in spaced relative positions;

said electronic feedback circuit is connected from said output transducer to said input transducer, said circuit having a Laplace transfer function $H(\omega)$ where $\omega$ is radian frequency, said circuit having circuit components with values such that $H(\omega)$ meets conditions (1), (2) and (3) as follows:

$$G(\omega)H(\omega) < 1 \text{ for all } \omega \text{ when } Im[G(\omega)H(\omega)] = 0 \quad (1)$$

$G(\omega)$ being the Laplace transfer function through said input transducer, through said structure, and through said output transducer, $Im[G(\omega)H(\omega)]$ being the imaginary part of the complex product $G(\omega)H(\omega)$, (2) $c_o Re[H(\omega)] < 1$, for all $\omega > 0$ that $Im[H(\omega)] = 0$, $c_o$ being a constant, $Re[H(\omega)]$ being the real part of the complex variable $H(\omega)$, and (3) $c_n Im[H(\omega)] < 0$ for all $\omega > 0$ and one or more of the modes to be damped, where for each said mode $n = 1, 2, \ldots$, each $c_n$ being a constant, $Im[H(\omega)]$ being the imaginary part of the complex variable $H(\omega)$.

4. A system for wideband damping as claimed in claim 3, wherein:

$c_o$ is defined in $G(\omega)$ as follows:

$$G(\omega) = c_o + \sum_{n=1}^{K} \frac{c_n}{\omega_n^2 - \omega^2 + j2\theta_n\omega_n\omega} \text{ and } c_1 = c_n \Big]_{n=1}$$

where K is the number of resonant modes controlled, and $\theta$ is relative damping.

5. In a system for damping mechanicl vibrations, the combination comprising:

a vibratable mechanical structure;

input and output vibration sensitive transducers fixed to said structure in spaced relative positions;

an electronic feedback circuit connected from said output transducer to said input transducer, said circuit having a Laplace transfer function $H(\omega)$ where $\omega$ is radian frequency, said circuit having circuit components with values such that $H(\omega)$ meets conditions (1), (2) and (3) as follows:

$$G(\omega)H(\omega) < 1 \text{ for all } \omega \text{ when } Im[G(\omega)H(\omega)] = 0 \quad (1)$$

$G(\omega)$ being the Laplace transfer function through said input transducer, through said structure and through said output transducer, $Im[G(\omega)H(\omega)]$, being the imaginary part of the complex product $G(\omega)H(\omega)$, (2) $c_o Re[H(\omega)] < 1$, for all $\omega > 0$ that $Im[H(\omega)] = 0$, $c_o$ being a constant, $Re[H(\omega)]$ being the real part of the complex variable $H(\omega)$, and (3) $c_n Im[H(\omega)] < 0$ for all $\omega > 0$, and one or more of the modes to be damped, where for each said mode $n = 1, 2, \ldots$, each $c_n$ being a constant, $Im[H(\omega)]$ being the imaginary part of the complex variable $H(\omega)$.

6. In a system for damping mechanical vibrations as claimed in claim 5, wherein:

$c_o$ is defined in $G(\omega)$ as follows:

$$G(\omega) = c_o + \sum_{n=1}^{K} \frac{c_n}{\omega_n^2 - \omega^2 + j2\theta_n\omega_n\omega} \text{ and } c_1 = c_n \Big]_{n=1}$$

where K is the number of resonant modes controlled, and $\theta$ is relative damping.

7. The method of damping mechanical vibrations, said method comprising the steps of:

providing a vibratable structure;

mounting input and output vibration transducers on said structure;

empirically determining the constants $c_o$ and $c_1$ of the transfer function $G(\omega)$ through said input transducer, through said structure and through said output transducer, where:

$$G(\omega) = c_o + \sum_{n=1}^{K} \frac{c_n}{\omega^2_n - \omega^2 + j2\theta_n\omega_n\omega} \text{ and } c_1 = c_n \Big]_{n=1}$$

where K is the number of resonant modes controlled, and $\theta$ is the relative damping; and connecting an electronic feedback circuit from said output transducer to said input transducer, said circuit having a Laplace transfer function $H(\omega)$ where $\omega$ is radian frequency, said circuit having circuit components with values such that $H(\omega)$ meets conditions (1), (2) and (3), as follows:

$$G(\omega)H(\omega) < 1 \text{ for all } \omega \text{ when } Im[G(\omega)H(\omega)] = 0 \tag{1}$$

$Im[G(\omega)H(\omega)]$ being the imaginary part of the complex product $G(\omega)H(\omega)$, (2) $c_o Re[H(\omega)] < 1$, for all $\omega > 0$ that $Im[H(\omega)] = 0$, $Re[H(\omega)]$ being the real part of the complex variable $H(\omega)$, and (3) $c_n Im[H(\omega)] < 0$ for all $\omega > 0$, and one or more of the modes to be damped, where for each said mode $n = 1, 2, \ldots$, $Im[H(\omega)]$ being the imaginary part of the complex variable $H(\omega)$.

8. The method of damping mechanical vibrations as claimed in claim 7, wherein:

said feedback circuit supplies a feedback signal to said input transducer that has a phase lagging the output signal of said output transducer more than 0° and less than 180°.

9. The method of damping mechanical vibrations as claimed in claim 8, wherein:

said feedback signal has a phase that lags the output signal of said output transducer approximately 90°.

* * * * *